US010237702B2

(12) United States Patent
Henze et al.

(10) Patent No.: US 10,237,702 B2
(45) Date of Patent: Mar. 19, 2019

(54) METHOD, COMPUTER PROGRAM AND DEVICE FOR A MOBILE DEVICE FOR ADAPTING A COMMUNICATION VIA A MOBILE COMMUNICATION SYSTEM

(71) Applicant: VOLKSWAGEN AG, Wolfsburg (DE)

(72) Inventors: Stefan Henze, Braunschweig (DE);
Manuel Joachim, Braunschweig (DE);
Kord H. Lühr, Wolfenbuttel (DE);
Gerd Penshorn, Edemissen (DE);
Anna Kureckova, Wolfsburg (DE);
Jochen Jencquel, Hamburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/805,699

(22) Filed: Nov. 7, 2017

(65) Prior Publication Data

US 2018/0132070 A1    May 10, 2018

(30) Foreign Application Priority Data

Nov. 9, 2016  (DE) .................. 10 2016 221 986

(51) Int. Cl.
*H04M 3/42*  (2006.01)
*H04W 4/04*  (2009.01)
*H04W 24/02*  (2009.01)
*H04W 36/02*  (2009.01)
*H04W 4/029*  (2018.01)
*H04W 4/40*  (2018.01)

(52) U.S. Cl.
CPC .......... *H04W 4/046* (2013.01); *H04W 4/029* (2018.02); *H04W 24/02* (2013.01); *H04W 36/02* (2013.01); *H04W 4/40* (2018.02)

(58) Field of Classification Search
CPC .................................................. H04W 4/046
See application file for complete search history.

(56) References Cited

U.S. PATENT DOCUMENTS

| | | | |
|---|---|---|---|
| 6,721,572 B1* | 4/2004 | Smith | H04W 76/19 455/456.1 |
| 9,020,536 B1* | 4/2015 | Crossno | G06Q 10/0833 455/456.1 |
| 2008/0262722 A1 | 10/2008 | Haag et al. | |
| 2009/0247147 A1 | 10/2009 | Hadinata et al. | |
| 2010/0240346 A1 | 9/2010 | Jain et al. | |
| 2011/0167128 A1 | 7/2011 | Raghunathan et al. | |
| 2017/0013406 A1* | 1/2017 | Oliver | H04W 4/025 |

FOREIGN PATENT DOCUMENTS

| | | |
|---|---|---|
| DE | 102011115108 A1 | 4/2012 |
| DE | 102011118706 A1 | 5/2013 |
| DE | 102012024869 A1 | 6/2014 |
| DE | 102013006125 A1 | 10/2014 |

* cited by examiner

*Primary Examiner* — Justin Y Lee
(74) *Attorney, Agent, or Firm* — Barnes & Thornburg LLP

(57) ABSTRACT

A method, a computer program, and an apparatus for a mobile device for adjusting communication via a mobile communication system. The method includes determining an imminent communication limitation of communication via a mobile communication system based on an anticipated position of the mobile device on a route which is traveled multiple times by the mobile device. The method calculates an anticipated temporal extent of the imminent communication limitation and adjusts the communication via the mobile communication system based on the anticipated temporal extent of the imminent communication limitation.

12 Claims, 3 Drawing Sheets

METHOD, COMPUTER PROGRAM AND DEVICE FOR A MOBILE DEVICE FOR ADAPTING A COMMUNICATION VIA A MOBILE COMMUNICATION SYSTEM

PRIORITY CLAIM

This patent application claims priority to German Patent Application No. 10 2016 221 986.3, filed 9 Nov. 2016, the disclosure of which is incorporated herein by reference in its entirety.

SUMMARY

Illustrative embodiments relate to a method, a computer program, and an apparatus for a mobile device for adjusting communication via a mobile communication system, optionally based on an anticipated temporal extent of an imminent communication limitation on a route which is traveled multiple times by the mobile device.

BRIEF DESCRIPTION OF THE DRAWINGS

Disclosed embodiments are described in greater detail below with reference to the drawings. The following are shown.

DETAILED DESCRIPTION

Figure 1:
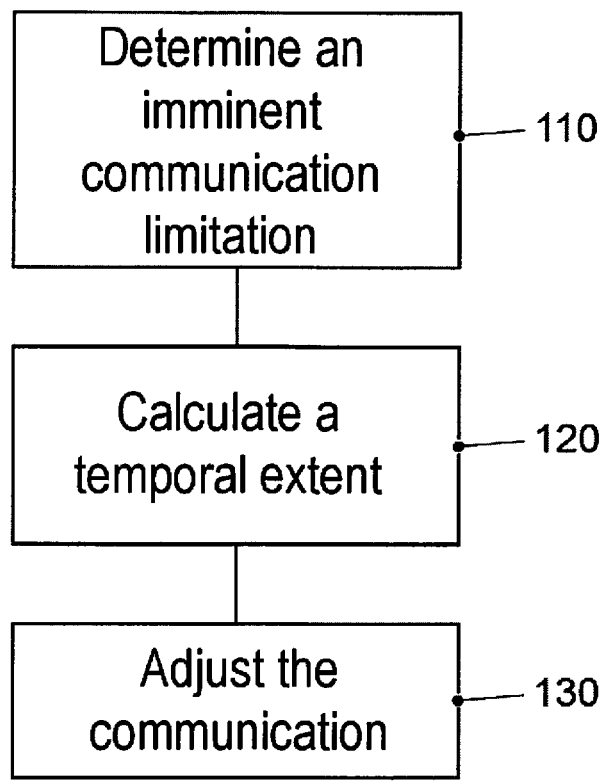
FIG. 1 shows a block diagram of a method for a mobile device.

One focus area of vehicle engineering is the networking of vehicles with other vehicles, with a data center of a vehicle manufacturer, or with the Internet. Due to the mobility of the vehicle, communication by the vehicle with other communication partners is possibly impeded, for instance, due to shadowing, reflections, interference, or due to a change in distance from the communication partners. The same problems are also often experienced by mobile devices which are transported in vehicles, for instance, in local public transport.

A multiplicity of services which use the networking of a mobile device via the Internet are possibly dependent on continuously reloading and buffering data, for instance, in a navigation application or during the playback of media data. If the mobile device experiences a communication limitation, playback of the media or reloading map data may be limited.

US patent application US 2011/0167128 A1 discloses a method for wireless communication. Here, one or multiple 'dead spots' on an anticipated route of a vehicle are determined, in which the vehicle has no access to the wireless communication, and the communication by the vehicle is adjusted based on the dead spots.

US patent application US 2009/0247147 A1 discloses a computer-implemented method for predicting interruptions in network coverage of a cellular network system, based on a location and a motion vector of a user of the cellular network system. Here, the user of the cellular network system is already informed before the interruption and is reconnected to its counterpart after the end of the interruption.

The need exists to provide an improved concept for communication by a mobile device via a mobile communication system.

This need is taken into account via the independent claims.

Exemplary embodiments provide a method, a computer program, and an apparatus for a mobile device, for instance, for a vehicle or a programmable mobile telephone. On a route which is traveled multiple times by the mobile device, for example, a commuter route on the road or in public transport, an (anticipated) imminent communication limitation of the mobile device, for instance, due to shadowing by tunnels or other obstacles or signal attenuation, may be predicted. Based on this prediction, an anticipated duration and/or an instant of the communication limitation may be calculated, and relevant data for this instant may be retrieved and buffered beforehand, for instance, to achieve uninterrupted playback of media. Furthermore, a user of a mobile device may be warned that a communication limitation is imminent, for instance, to delay a telephone conversation, to automatically resume it following the communication limitation, or to point out alternative routes in which the communication limitation may be delayed, reduced, or avoided.

Exemplary embodiments provide a method for a mobile device. The mobile device may, for example, be a vehicle or a programmable mobile telephone (smartphone), or a vehicle may comprise the mobile device. The method comprises determining an imminent communication limitation of communication via a mobile communication system, based on an anticipated position of the mobile device on a route which is traveled multiple times by the mobile device. The route which is traveled multiple times by the mobile device may, for example, correspond to a commuter route/commuting route. The method furthermore comprises calculating an anticipated temporal extent of an imminent communication limitation. The method furthermore comprises adjusting the communication via the mobile communication system, based on the anticipated temporal extent of the imminent communication limitation.

By determining the anticipated temporal extent of the imminent communication limitation, for example, data, for instance, media data or navigation data which may be used during the (imminent) communication limitation, may be requested and buffered before the communication limitation, or information about a possible avoidance, reduction, or delay of the communication limitation may be provided.

For example, the communication via the mobile communication system may correspond to a voice call. The adjustment of the communication may comprise an interruption and resumption of the voice call. As a result, for example, convenience and safety of a user of the mobile device (for instance, a driver of the vehicle) may be increased, in that additional user interaction is avoided.

For example, the communication via the mobile communication system may correspond to data communication. The adjustment may furthermore comprise anticipatory buffering of the data communication, based on the anticipated temporal extent of the imminent communication limitation. The anticipatory buffering may, for example, make it possible that data which is needed during the anticipated temporal extension of the communication limitation is available despite the communication limitation.

In at least some exemplary embodiments, the mobile device may be a vehicle. The anticipatory buffering may be carried out while the vehicle is stationary. If the route which is traveled multiple times by the vehicle is known (for example, a commuter route), the method may, for example, download the data, for instance, media data or navigation data, during the stationary period, for instance, via a wireless local area network (WLAN).

In at least some exemplary embodiments, the determination of the imminent communication limitation may be based on a map of anticipated communication limitations. For example, the map may enable an adjustment of the communication, based on communication limitations which were determined by other mobile devices.

For example, the method may furthermore comprise determining at least a portion of the map of the anticipated communication limitations. In addition or alternatively, the method may furthermore comprise receiving at least a portion of the map of the anticipated communication limitations. In addition or alternatively, the method may furthermore comprise transmitting at least a portion of the map of the anticipated communication limitations. Determining and/or exchanging at least a portion of the map of the anticipated communication limitations may, for example, enable a more precise or more instantaneous calculation of the temporal extent of the imminent communication limitation.

In at least some exemplary embodiments, the method may comprise providing a piece of information about an instant and/or a duration of the imminent communication limitation, based on the anticipated temporal extent of the imminent communication limitation, for example, via a visual output device or an audio output device. Alternatively or in addition, the method may furthermore comprise providing a piece of information about at least one driving alternative, based on the imminent communication limitation. For example, the piece of information about the driving alternative may comprise information about an alternative route or about an adjusted speed, for instance, to terminate a call or a data transmission before the imminent communication limitation, or to reduce or avoid the communication limitation.

Exemplary embodiments furthermore provide a program including program code for carrying out the method, if the program code is executed on a computer, a processor, a control module, or a programmable hardware component.

Exemplary embodiments furthermore provide an apparatus for a mobile device. The apparatus comprises a communication module which is configured for communication via a mobile communication system. The apparatus furthermore comprises a control module which is configured for controlling the communication module. The control module is furthermore configured for determining an imminent communication limitation of the communication via the mobile communication system, based on an anticipated position of the mobile device on a route which is traveled multiple times by the mobile device. The control module is furthermore configured for calculating an anticipated temporal extent of the imminent communication limitation. The control module is furthermore configured for adjusting the communication via the mobile communication system, based on the anticipated temporal extent of the imminent communication limitation.

Exemplary embodiments furthermore provide a mobile device, for instance, a vehicle or a smartphone, comprising the apparatus for the mobile device.

Various exemplary embodiments will now be described in greater detail with reference to the attached drawings, in which several exemplary embodiments are depicted. In the figures, the thickness dimensions of lines, layers, and/or regions may be depicted in an exaggerated manner for the sake of clarity.

In the following description of the attached figures, which merely depict several exemplary embodiments, identical reference characters may denote identical or comparable components. Furthermore, summary reference characters may be used for components and objects which appear multiple times in at least one exemplary embodiment or in one drawing, but which are described jointly with respect to one or multiple features. Components or objects which are described having identical or summary reference characters may be designed identically, but also differently as appropriate, with respect to individual features, multiple features, or all features, for example, their dimensions, unless otherwise evident explicitly or implicitly from the description.

Although exemplary embodiments may be modified and altered in different ways, exemplary embodiments are illustrated as examples in the figures and will be described herein in detail. However, it should be made clear that there is no intention to limit exemplary embodiments to the respective disclosed forms; but rather, exemplary embodiments are to cover all functional and/or structural modifications, equivalents, and alternatives which lie within the scope of the present disclosure. Identical reference characters denote identical or similar elements throughout the description of the figures.

It is to be noted that an element which is described as being 'connected to' or 'linked with' another element may be directly connected to or linked with the other element, or that interjacent elements may be present. On the other hand, if an element is described as being 'directly connected to' or 'directly linked with' another element, no interjacent elements are present. Other terms which are used to describe the relationship between elements should be interpreted in a similar manner (for example, 'between' versus 'directly between', 'adjacent' versus 'directly adjacent', etc).

The terminology which is used herein serves only to describe exemplary embodiments and is not intended to limit the exemplary embodiments. As used herein, the singular forms 'a', 'an', and 'the' may also include the plural forms as long as the context does not expressly specify otherwise. Furthermore, it is to be understood that the terms such as 'contains', 'containing', 'has', 'comprises', 'comprising', and/or 'having', when used herein, specify the presence of stated features, integers, operations, elements and/or components, but do not preclude the presence or addition of one or more other features, integers, operations, elements, components and/or groups thereof.

Unless otherwise defined, all terms (including technical and scientific terms) used herein have the same meaning as ascribed to them by persons having ordinary skill in the art, in the field to which these exemplary embodiments belong. It is to be understood that expressions such as those defined in commonly used dictionaries are to be interpreted as having the meaning which is consistent with their meaning in the context of the relevant technology, and are not to be interpreted in an idealized or overly formal sense unless otherwise expressly defined herein.

At least some exemplary embodiments provide improved concepts for positively circumventing 'dead spots'. Dead spots in the cellular network range sometimes result in interruptions of phone call connections and data service connections. On regular (commuting) routes, these dead spots may reoccur (and/or are known) and/or could also be ascertained without provider assistance. At least some exemplary embodiments provide an improved concept of how vehicles can positively circumvent such dead spots.

Positively circumventing dead spots may, for example, comprise:
- Telephony: pre-notification of the outage or the resumption in a reception area
- Navigation: 'route having the best network coverage' route option
- Downloads: recommendation of locations having the best Internet connection for larger downloads (for example, vehicle functions)
- Streaming: pre-buffering content which would likely be played back in the dead spot.

Dead spots are not assessed as a total outage in at least some exemplary embodiments. At least some exemplary embodiments may be based on finding solutions to problems in the infrastructure independently of the application-side cellular network service provider.

Figure 1A:
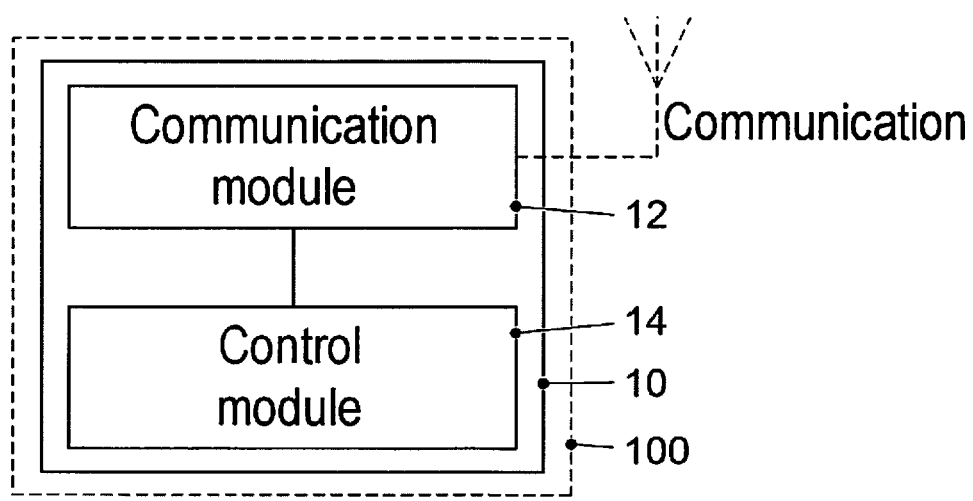
FIG. 1a shows a flow chart of an apparatus for a mobile device.

FIG. 1 shows a flow chart of a method for a mobile device 100. The method comprises determining 110 an imminent communication limitation of communication via a mobile communication system, based on an anticipated (future) position of the mobile device 100 on a route which is traveled (for instance, driven) multiple times by the mobile device 100. The method furthermore comprises calculating 120 an anticipated temporal extent of the imminent communication limitation. The method furthermore comprises adjusting 130 the communication via the mobile communication system, based on the anticipated temporal extent of the imminent communication limitation. FIG. 1a shows a corresponding apparatus 10 for the mobile device 100. The apparatus 10 comprises a communication module 12 which is configured for communication via a mobile communication system. The apparatus 10 comprises a control module 14 which is configured for carrying out the method operations, for instance, in interaction with (for instance, via) the communication module. The control module 14 is configured for controlling the communication module 12. The control module 14 is furthermore configured for determining the imminent communication limitation of the communication via the mobile communication system, based on the anticipated position of the mobile device 100 on the route which is traveled multiple times by the mobile device 100. The control module 14 is furthermore configured for calculating the anticipated temporal extent of the imminent communication limitation (for instance, based on the anticipated position of the mobile device 100 on the route which is traveled multiple times by the mobile device 100, and/or based on the determined imminent communication limitation). The control module 14 is furthermore configured for adjusting the communication via the mobile communication system (via the communication module 12), based on the anticipated temporal extent of the imminent communication limitation.

The mobile device may, for example, correspond to a vehicle or a portable communication device, for instance, a programmable mobile telephone or a mobile reception point (hotspot). Alternatively, the mobile device may correspond to a device of a vehicle for communication via the mobile communication network. The vehicle may comprise the device for communication via the mobile communication network.

For example, the determination 110 of the imminent communication limitation may be based on at least one communication limitation of the communication when previously traveling the route. For example, the determination 110 of the imminent communication limitation may be based on a map of anticipated communication limitations. For example, the map of the anticipated communication limitations may at least one element from the group including information about a (average or minimum) signal strength or signal quality for a position, information about a probability of a communication limitation for a position, information about an anticipated occurrence of a communication limitation for a position, information about available mobile communication networks for a position, and information about an anticipated available data rate for a position, for example, for various providers of mobile communication systems. The method may, for example, furthermore comprise determining at least a portion of the map of the anticipated communication limitations, for instance, based on traveling the route. Alternatively or in addition, the method may furthermore comprise receiving at least a portion of the map of the anticipated communication limitations, for example, via the mobile communication system or via (direct) mobile device-to-mobile device communication (for instance, vehicle-to vehicle communication) with at least one additional mobile device (vehicle). For example, the additional mobile device may move in an opposite direction. In at least some exemplary embodiments, the method may furthermore comprise transmitting at least a portion of the map of the anticipated communication limitations, for example, to a central location via the mobile communication system or via direct mobile device-to-mobile device communication.

For example, in a first operation, dead spots or network performance on known commuter routes may be determined for individual users. The piece of information (for instance, at least a portion of the map of the anticipated communication limitations) may remain (be stored) in the vehicle or on the mobile device. For example, the apparatus 10 may comprise a memory for storing at least a portion of the map.

In a second operation, dead spots/network performance may, for example, be determined via a plurality of mobile devices, for instance, via a fleet of mobile devices. The piece of information (for instance, at least a portion of the map of the anticipated communication limitations) may be enriched with other data and processed by transmitting the data to a central location (back end).

Alternatively or in addition, the determination 110 may be based on a temporal position of the mobile device 110 on the route, for example, after the start of a trip or after driving onto a route section.

The calculation of the anticipated temporal extent of the imminent communication limitation may, for example, comprise at least one element from the group including an anticipated start time, an anticipated end time, an anticipated distance until the anticipated start time, an anticipated distance until the anticipated end time, an anticipated duration, and an anticipated remaining time until a start of the imminent communication limitation. For example, the calculation of the anticipated extent may be based on an (instantaneous or average) speed of the mobile device (relative to the route). In at least some exemplary embodiments, the calculation of the anticipated extent may be based on information about previous communication limitations, for example, based on the map of the anticipated communication limitations and/or based on previously traveled routes of the mobile device 100.

For example, the adjustment 130 of the communication may comprise a suspension and resumption of the communication, based on the anticipated temporal extent of the (imminent) communication limitation. For example, for performing the adjustment 130, a call may be interrupted, or a transmission of data packets may be reduced or stopped, even before the occurrence of the (imminent) communication limitation.

For example, the communication via the mobile communication system may correspond to or comprise a voice call. The adjustment 130 of the communication may, for example, comprise an interruption and (automatic) resumption of the voice call and, for example, provision of a piece of information about the interruption and (automatic) resumption, for example, including information about an instant and anticipated duration of the (imminent) communication limitation (see FIG. 2a).

Alternatively or in addition, communication via the mobile communication system may correspond to or comprise data communication. For example, the adjustment 130 may furthermore comprise anticipatory buffering of the data communication, based on the anticipated temporal extent of the imminent communication limitation. The data communication may, for example, comprise at least one element from the group including media data, vehicle functions, or navigation data. For example, the adjustment 130 may comprise requesting and receiving data which is relevant during the imminent communication limitation, (temporally or geographically) before the imminent communication limitation, for instance, portions (for instance, music pieces) of media playback, or map material from a navigation application. For example, the mobile device may be a vehicle. The anticipatory buffering may, for example, be carried out while the vehicle is stationary, for instance, based on progress of a media playback list (playlist) of the mobile device, or based on a course of the route (for navigation applications). If the anticipatory buffering is (likely) not sufficient for the temporal extent of the communication limitation, the method may furthermore comprise a (smooth) switchover of media playback to another playback medium (for instance, radio, CD, or stored media data), based on the anticipated extent of the imminent communication limitation and/or based on the anticipatory buffering.

Figure 2A:
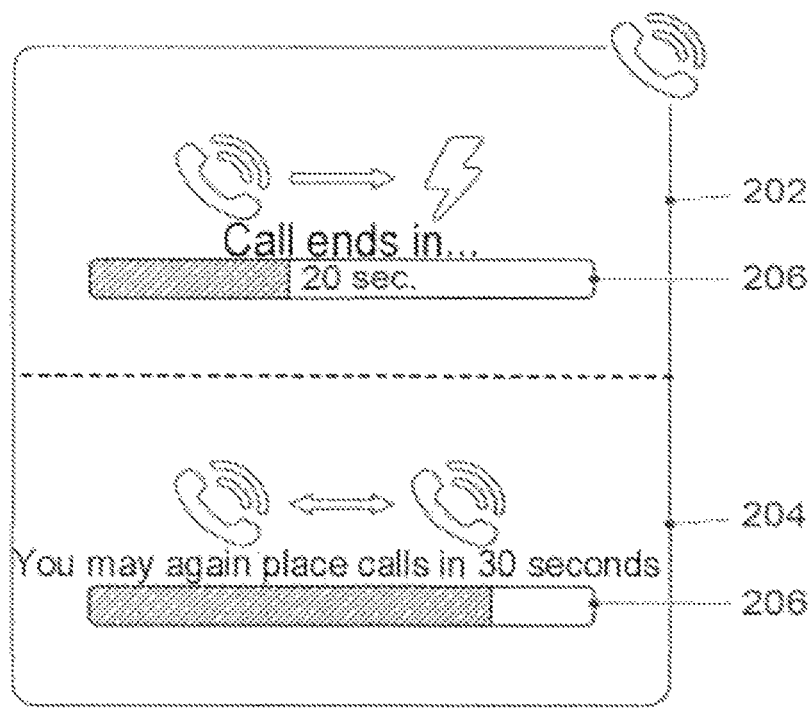
FIG. 2a shows a depiction of a piece of information about an instant and/or a duration of the imminent communication limitation.

In at least some exemplary embodiments, the method may comprise providing a piece of information about an instant and/or a duration of the imminent communication limitation, based on the anticipated temporal extent of the imminent communication limitation, for instance, via a visual output device (for instance, a screen or a lighting mechanism) or a loudspeaker. The apparatus 10 may, for example, comprise the visual output device or the loudspeaker or an interface for communication with the visual output device or the loudspeaker. For example, a use of the mobile device may be adjusted, based on the piece of information about the (start) time and/or the duration of the imminent communication limitation. For example, the piece of information about the instant and/or the duration of the imminent communication limitation may comprise information about an imminent interruption and resumption of a voice call (FIG. 2a).

In addition or alternatively, the method may furthermore comprise providing information about at least one driving alternative, based on the imminent communication limitation, for instance, if the mobile device is a vehicle or is transported in a vehicle. For example, the method may furthermore comprise calculating a route of the driving alternative, based on the imminent communication limitation, and the piece of information about the at least one driving alternative may comprise information about the route of the driving alternative. Alternatively or in addition, the piece of information about the at least one driving alternative may comprise information about an alternative driving speed, and information about an effect of the alternative driving speed on the anticipated temporal extent of the imminent communication limitation.

The anticipated position may, for example, correspond to a position at which the mobile device likely stops at a (predetermined) instant or time interval in the future, for instance, based on an instantaneous (geographical or temporal) position and an instantaneous speed or an average speed on at least one section of the route. The route which is traveled multiple times by the mobile device may, for example, correspond to a commuter route, for example, a route which is regularly traveled (for instance, daily, on workdays, weekly, monthly, yearly) at a similar time (for instance, ±15 minutes, ±30 minutes, ±1 hour, ±2 hours). The imminent communication limitation may, for example, comprise at least one element from the group including a limited communication data rate (for instance, below a threshold value), the impossibility of using telephony functions, and an interruption of communication with a base station.

The communication module 12 may, for example, correspond to one or multiple inputs and/or one or multiple outputs for receiving and/or transmitting information, for instance, in digital bit values, based on a code, within a module, between modules, or between modules of different entities. The communication module 12 may, for example, be configured to communicate over at least one mobile communication system from the group including Global System for Mobile Telecommunications (GSM), General Packet Radio Service (GPRS), Enhanced Data Rates for GSM Evolution (EDGE), Universal Mobile Telecommunication System (UMTS), Long Term Evolution, and a fifth-generation (5G) cellular network system.

In exemplary embodiments, the control module 14 may correspond to any arbitrary controller or processor, or to a programmable hardware component. For example, the control module 14 may also implemented as software which is programmed for a corresponding hardware component. In this respect, the control module 14 may be implemented as programmable hardware with correspondingly adapted software. In this case, any processors, such as digital signal processors (DSPs), may be used. Exemplary embodiments are not limited to a certain type of processor. Any arbitrary processors, or even multiple processors, are conceivable for implementing the control module 14.

In at least some exemplary embodiments, the vehicle could, for example, correspond to a land vehicle, a water vehicle, an aircraft, a rail vehicle, a street vehicle, an automobile, a terrain vehicle, a motor vehicle, or a truck.

FIG. 2a shows a depiction of a piece of information about an instant and/or a duration of the imminent communication limitation according to at least one exemplary embodiment of a method or an apparatus for a mobile device, wherein the communication may comprise a voice call (telephony). In some cases, an interruption of a phone call due to a dead spot (a communication limitation) cannot be prevented. For example, positively circumventing the infrastructure weakness may comprise a pre-notification:

'Call will end in in 20 seconds' (or, for example, 'cell phone dead zone in . . . 20 seconds') (FIG. 2a 202)

'You may again place calls in 30 seconds' (or, for example, 'redial in . . . ') (FIG. 2a 204)

'If you drive on the far right at 80 km/h instead of on the left at 190 km/h, you can talk for one minute longer'.

For example, the piece of information about the instant and/or the duration of the imminent communication limitation may comprise a progress bar 206 for visualizing the instant or the duration.

More details of the method or the apparatus are mentioned in connection with the concept or examples which have been previously described (for example, FIGS. 1 and 1a). The method and the apparatus may comprise one or multiple additional optional features which correspond to one or multiple embodiments of the provided concept or the described examples, as they have been previously or subsequently described.

Figure 2B:
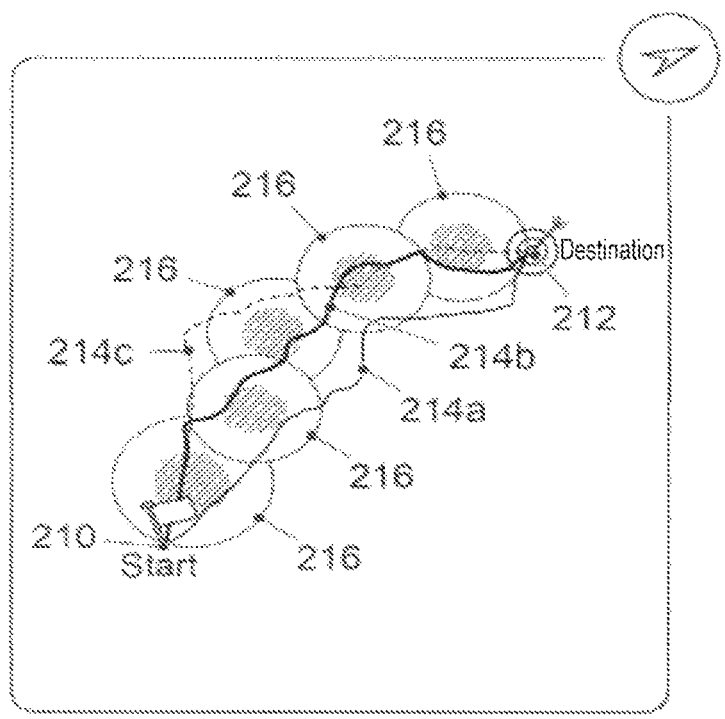
FIG. 2b shows a depiction of a piece of information about at least one driving alternative.

FIG. 2b shows a depiction of a piece of information about at least one driving alternative according to an exemplary embodiment of a method or an apparatus for a mobile device. The piece of information about the at least one driving alternative may, for example, comprise information about a starting point 210 of a route, information about a destination 212 of the route, possible routes 214a to 214c, and information about network coverage 216.

For example, in the navigation context (for calculating the possible routes 214a to 214c), the network coverage may be a factor in the route evaluation:

Route 1: Fastest 214c
Route 2: Shortest 214a
Route 3: Best network coverage 214b More details of the method or the apparatus are mentioned in connection with the concept or examples which have been previously described (for example, FIGS. 1 to 2a). The method and the apparatus may comprise one or multiple additional optional features which correspond to one or multiple embodiments of the provided concept or the described examples, as they have been previously or subsequently described.

Figure 2C:
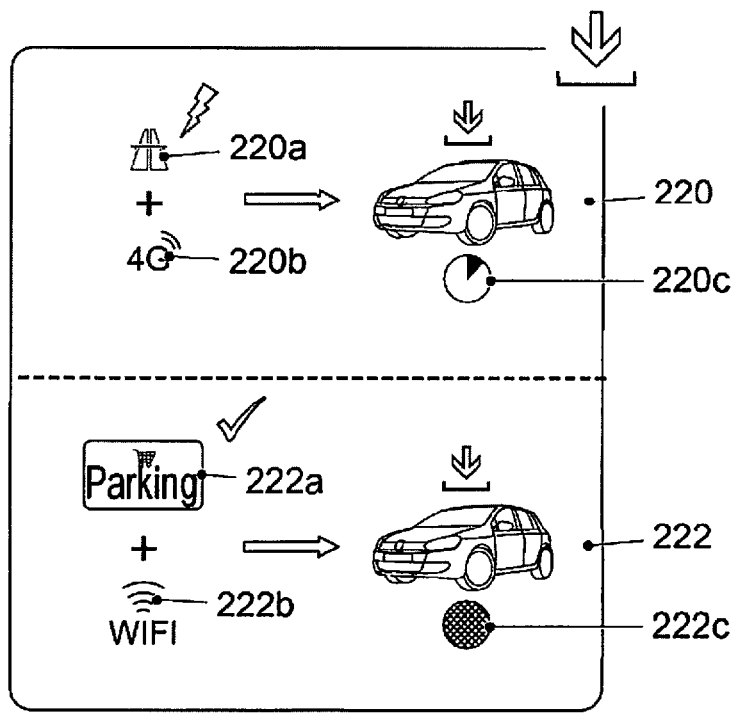
FIG. 2c shows an exemplary embodiment of anticipatory buffering while a vehicle is stationary.

FIG. 2c shows an exemplary embodiment of anticipatory buffering while the vehicle is stationary. For example, in the case of anticipatory buffering 220 during a trip on a motorway 220a with a 4G (LTE) connection 220b, in some cases, only a portion of the buffer 220c may be filled. If the anticipatory buffering 222 takes place via a (free) WLAN connection 222b (Free WiFi, Wireless Fidelity) while parking 222a, the buffer 222c may possibly be completely filled at no cost or at reduced cost.

For example, in the context of downloadable functions for the mobile device (for instance, media or navigation), for example, an existing WiFi infrastructure may may be located and utilized within a manufacturer's ecosystem. For example, the mobile device (for instance, a vehicle) may download (for instance, proactively buffer) the function via free WiFi during a purchase. A depiction is possible, for example, via a map.

More details of the method or the apparatus are mentioned in connection with the concept or examples which have been previously described (for example, FIGS. 1 to 2b). The method and the apparatus may comprise one or multiple additional optional features which correspond to one or multiple embodiments of the provided concept or the described examples, as they have been previously or subsequently described.

Figure 2D:
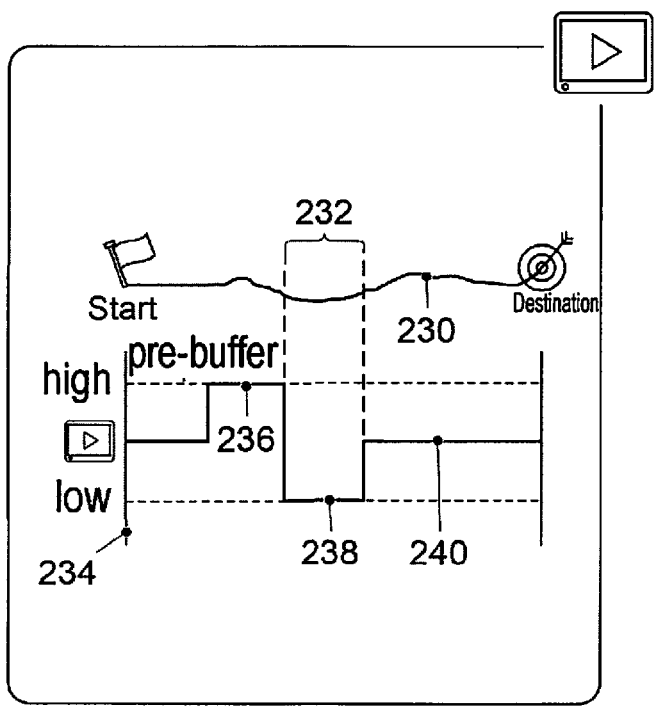
FIG. 2d shows an additional exemplary embodiment of anticipatory buffering.

FIG. 2d shows an additional exemplary embodiment of anticipatory buffering, for instance, with respect to the continuous downloading of media content (streaming). On a route 230 (from start 230a to destination 230b), a communication limitation 232 (dead zone) may prevent a sufficiently rapid reception of media data. The diagram 234 illustrates the anticipatory buffering: before the communication limitation, the media content may be pre-buffered at a high speed 236; during the communication limitation, a lower speed 238 may be used for transmission. Following the communication limitation, the transmission speed may correspond approximately, for instance, to the data rate 240 of the media content.

Having knowledge of the dead spots and the individual streaming behavior, streaming content may be pre-buffered on commuting routes. If, for example, a user has a dead spot at the A2/A39 intersection and listens every day to the entire playlist which starts at the beginning of the trip, songs 5 and 6 of the playlist may be pre-buffered at the instantaneous speed, for example, based on the anticipated temporal extent of the imminent communication limitation.

An additional exemplary embodiment is a computer program for carrying out at least one of the above-described methods, if the computer program runs on a computer, a processor, or a programmable hardware component. Another additional exemplary embodiments is a digital storage medium which is machine-readable or computer-readable, and which has electronically readable control signals which interact with programmable hardware components in such a way that one of the above-described methods is carried out.

The features disclosed in the above description, the following claims, and the attached figures may be relevant and may be implemented in their various embodiments both individually as well as in any arbitrary combination for carrying out an exemplary embodiment.

Although some embodiments have been described with respect to an apparatus, it is to be understood that these embodiments also constitute a description of the corresponding method, so that a block or a structural component of an apparatus may also be understood to be a corresponding method operation or a feature of a method operation. Similarly, embodiments which have been described with respect to a method operation or as a method operation also represent a description of a corresponding block or detail or feature of a corresponding apparatus.

Depending on implementation requirements, exemplary embodiments of the present disclosure may be implemented in hardware or in software. The implementation may be carried out using a digital storage medium, for example, a floppy disk, a DVD, a Blu-Ray disc, a CD, a ROM, a PROM, an EPROM, an EEPROM or a FLASH memory, a hard disk, or another magnetic or optical memory on which electronically readable control signals are stored which may interact, or interact, with a programmable hardware component in such a way that the respective method is carried out.

A programmable hardware component may be formed via a processor, a central processing unit (CPU), a graphics processing unit (GPU), a computer, a computer system, an application-specific integrated circuit (ASIC), an integrated circuit (IC), a system on chip (SOC), a programmable logic element, or a field-programmable gate array (FPGA) including a microprocessor.

The digital storage medium may therefore be machine-readable or computer-readable. Some exemplary embodiments thus include a data carrier which has electronically readable control signals which are capable of interacting with a programmable computer system or a programmable hardware component in such a way that one of the methods described herein is carried out. At least one exemplary embodiment is thus a data carrier (or a digital storage medium or a computer-readable medium) on which the program is stored for carrying out one of the methods described herein.

Generally, exemplary embodiments may be implemented as a program, firmware, a computer program, or a computer program product including program code, or as data, wherein the program code or the data is/are effective for carrying out one of the methods if the program runs on a processor or a programmable hardware component. The program code or the data may, for example, also be stored on a machine-readable carrier or data carrier. Among other things, the program code or the data may exist as source code, machine code, or byte code, as well as other intermediate code.

Furthermore, at least one additional exemplary embodiment is a data stream, a signal sequence, or a sequence of signals, which constitute(s) the program for carrying out one of the methods described herein. The data stream, the signal sequence, or the sequence of signals may, for example, be configured to be transferred via a data communication connection, for example, via the Internet or another network. Exemplary embodiments are thus also signal sequences representing data, the sequences being suitable for transmission via a network or a data communication connection, wherein the data constitute the program.

A program according to at least one exemplary embodiment may implement one of the methods during its execution, for example, by reading out these storage areas or writing a piece of data or multiple pieces of data into them, whereby switching operations or other operations are possibly generated in transistor structures, in amplifier structures, or in other electrical, optical, or magnetic components, or components operating according to another functional principle. Accordingly, data, values, sensor values, or other information may be recorded, determined, or measured by a program, by reading out a memory location. A program may therefore record, determine, or measure variables, values, measured variables, and other information by reading out one or multiple memory areas, and may effect, initiate, or carry out an action by writing into one or multiple storage areas, and may control other devices, machines, and components.

The above-described exemplary embodiments constitute merely an illustration of the principles of the present disclosure. It is to be understood that modifications and variations of the arrangements and details described herein will be clear to others skilled in the art. Therefore, it is intended that the present disclosure is to be limited only by the scope of protection of the patent claims below, not by the specific details which have been presented herein based on the description and the explanation of the exemplary embodiments.

LIST OF REFERENCE CHARACTERS

10 Apparatus
12 Communication module
14 Control module
100 Mobile device
110 Determine an imminent communication limitation
120 Calculate a temporal extent
130 Adjust the communication
202 Depiction 'Call ends in 20 seconds'
204 Depiction 'You may again place calls in 30 seconds'
206 Progress bar
210 Starting point
212 Destination
214a to 214c Possible routes
216 Network coverage
220 Depiction 'Anticipatory buffering during trip on motorway'
220a Motorway
220b 4G connection
220c Buffer
222 Depiction 'Anticipatory buffering while parking'
222a Parking
222b WLAN connection
222c Buffer
230 Route
230a Start of the route
230b Destination of the route
232 Communication limitation
234 Diagram of the transmission speed
236 Higher speed
238 Lower speed
240 Data rate of the media content

The invention claimed is:

1. A method for a transportation vehicle, the method comprising:
determining an imminent communication limitation of data communication via a mobile communication system based on an anticipated position of the transportation vehicle on a route which is traveled multiple times by the transportation vehicle;
calculating an anticipated temporal extent of the imminent communication limitation; and
adjusting the data communication via the mobile communication system based on the anticipated temporal extent of the imminent communication limitation,
wherein the adjustment comprises anticipatory buffering of the data communication while the transportation vehicle is stationary based on the anticipated temporal extent of the imminent communication, and
providing a piece of information about at least one of an instant and a duration of the imminent communication limitation based on the anticipated temporal extent of the imminent communication limitation; and
providing information about at least one driving alternative based on the imminent communication limitation.

2. The method of claim 1, wherein the determination determines the imminent communication device for a voice call, and wherein the method further comprises an adjustment of the voice call via the mobile communication system by interrupting and resuming the voice call based on the anticipated temporal extent of the imminent communication limitation.

3. The method of claim 1, wherein the determination of the imminent communication limitation is based on a map of anticipated communication limitations.

4. The method of claim 3, further comprising one or more of the following steps:
determining at least a portion of the map of the anticipated communication limitations;
receiving at least a portion of the map of the anticipated communication limitations; and
transmitting at least a portion of the map of the anticipated communication limitations.

5. A program product including program code for carrying out a method for a transportation vehicle in response to the program code being executed on a computer, a processor, a control module, or a programmable hardware component included in the transportation vehicle, the method comprising:
determining an imminent communication limitation of data communication via a mobile communication system based on an anticipated position of the transportation vehicle on a route which is traveled multiple times by the transportation vehicle;

calculating an anticipated temporal extent of the imminent communication limitation; and adjusting the data communication via the mobile communication system based on the anticipated temporal extent of the imminent communication limitation, wherein the adjustment comprises anticipatory buffering of the data communication while the transportation vehicle is stationary based on the anticipated temporal extent of the imminent communication limitation, providing a piece of information about at least one of an instant and a duration of the imminent communication limitation based on the anticipated temporal extent of the imminent communication limitation; and providing information about at least one driving alternative based on the imminent communication limitation.

6. The program product of claim 5, wherein the determination determines the imminent communication device for a voice call, and wherein the method further comprises an adjustment of the voice call via the mobile communication system by interrupting and resuming the voice call based on the anticipated temporal extent of the imminent communication limitation.

7. The program product of claim 5, wherein the determination of the imminent communication limitation is based on a map of anticipated communication limitations.

8. The program product of claim 5, wherein the method further comprises one or more of the following steps:

determining at least a portion of the map of the anticipated communication limitations;

receiving at least a portion of the map of the anticipated communication limitations; and transmitting at least a portion of the map of the anticipated communication limitations.

9. An apparatus for a vehicle, the apparatus comprising:

a communication module for data communication via a mobile communication system; and a control module for:

controlling the communication module, determining an imminent communication limitation of the data communication via the mobile communication system based on an anticipated position of the vehicle on a route which is traveled multiple times by the vehicle, calculating an anticipated temporal extent of the imminent communication limitation, adjusting the data communication via the mobile communication system based on the anticipated temporal extent of the imminent communication limitation, wherein the adjustment further comprises anticipatory buffering of the data communication while the vehicle is stationary based on the anticipated temporal extent of the imminent communication limitation, and providing a piece of information about at least one of an instant and a duration of the imminent communication limitation based on the anticipated temporal extent of the imminent communication limitation; and providing information about at least one driving alternative based on the imminent communication limitation.

10. The apparatus of claim 9, wherein the determination determines the imminent communication device for a voice call, and wherein the method further comprises an adjustment of the voice call via the mobile communication system by interrupting and resuming the voice call based on the anticipated temporal extent of the imminent communication limitation.

11. The apparatus of claim 9, wherein the determination of the imminent communication limitation is based on a map of anticipated communication limitations.

12. The apparatus of claim 9, wherein at least a portion of the map of the anticipated communication limitations is determined by at least one of;

at least a portion of the map of the anticipated communication limitations is received; and at least a portion of the map of the anticipated communication limitations is transmitted.

\* \* \* \* \*